United States Patent
Bluvband et al.

(10) Patent No.: US 8,150,822 B2
(45) Date of Patent: Apr. 3, 2012

(54) ON-LINE ITERATIVE MULTISTAGE SEARCH ENGINE WITH TEXT CATEGORIZATION AND SUPERVISED LEARNING

(75) Inventors: Zigmund Bluvband, Rishon LeZion (IL); Sergey Porotsky, Yehud (IL)

(73) Assignee: Favoweb Ltd., Tel-Aviv (IL)

( * ) Notice: Subject to any disclaimer, the term of this patent is extended or adjusted under 35 U.S.C. 154(b) by 668 days.

(21) Appl. No.: 12/007,305

(22) Filed: Jan. 9, 2008

(65) Prior Publication Data
US 2008/0168056 A1   Jul. 10, 2008

Related U.S. Application Data

(60) Provisional application No. 60/879,349, filed on Jan. 9, 2007.

(51) Int. Cl.
*G06F 17/00* (2006.01)
(52) U.S. Cl. ................ 707/705; 707/711
(58) Field of Classification Search ............ 707/705, 707/999.003, 711
See application file for complete search history.

(56) References Cited

U.S. PATENT DOCUMENTS

| | | |
|---|---|---|
| 5,794,178 A | 8/1998 | Caid et al. |
| 5,974,412 A | 10/1999 | Hazlehurst et al. |
| 6,853,998 B2 | 2/2005 | Biebesheimer et al. |
| 6,873,990 B2 | 3/2005 | Oblinger |
| 6,990,628 B1 | 1/2006 | Palmer et al. |
| 2004/0068486 A1* | 4/2004 | Chidlovskii .............. 707/3 |
| 2007/0198486 A1* | 8/2007 | Abrams et al. ............. 707/3 |
| 2007/0203782 A1* | 8/2007 | Flores ................... 705/10 |
| 2008/0154873 A1* | 6/2008 | Redlich et al. ............ 707/5 |

* cited by examiner

*Primary Examiner* — Belix M Ortiz
(74) *Attorney, Agent, or Firm* — Pearl Cohen Zedek Latzer, LLP

(57) ABSTRACT

A system and method for performing a user supervised search which uses algorithm with parameters that are updated based on the review of the search results by the user.

8 Claims, 6 Drawing Sheets

| Non-Structured Parameters (Free Text with some Rules) | Structured Parameters (optional): |
|---|---|
| Text (one or several words) | Language |
| Rules (optionally): | File Format |
| Using of "AND" | Date |
| Using of "OR" | Domain |
| Using of function "to exclude some words" | Etc. |
| Using of function "words on the common phrase" | |

Fig. 2A

| Type and name of input parameters | Value of parameter according binary coding | Value of parameter according frequency coding |
|---|---|---|
| Non-Structured Parameters (Words for Free Text): | | |
| Word 1 From Vocabulary | 0 | 0 |
| Word 2 From Vocabulary | 0 | 0 |
| Word 3 From Vocabulary | 1 | 0.25 |
| ...... | | |
| Word 1331 From Vocabulary | 1 | 0.167 |
| ...... | | |
| Last Word From Vocabulary | 0 | 0 |
| Structured Parameters (OPTIONALLY): | | |
| Language | 7 (Russian) | 7 (Russian) |
| Date | 1998 (Year) | 1998 (Year) |
| Format | 4 (PostScipt) | 4 (PostScipt) |

Fig. 3

ON-LINE ITERATIVE MULTISTAGE SEARCH ENGINE WITH TEXT CATEGORIZATION AND SUPERVISED LEARNING

CROSS REFERENCE TO RELATED APPLICATIONS

This application claims the benefit of U.S. Provisional Application Ser. No. 60/879,349, filed on Jan. 9, 2007 (and entitled ON-LINE ITERATIVE MULTISTAGE SEARCH ENGINE WITH TEXT CATEGORIZATION AND SUPERVISED LEARNING) which is incorporated in its entirety herein by reference.

FIELD OF THE INVENTION

The present invention relates generally to search engines and text mining systems, and more particularly to search engines and text mining systems directed to iterative multistage search methods and systems with on-line feedback from user and iterative supervised learning, based on this feedback.

BACKGROUND OF THE INVENTION

Currently there exist many systems designed to perform textual or other engine search. With the rapid growth of the internet and users of the internet over the past ten years, a rapid increase in the amount of information available over the internet has developed. Many UNIVERSAL search engines, such as Google, Yahoo, AltaVista, Rambler, etc. are available to users and provide powerful search tools for general use. These search engines enable any user to query the wide repository of public web-based documents that are indexed by these systems. Search engines propose different strategies from one another in attempting to find documents which are most relevant to the user-specified search criteria. Another way of attempting to receive relevant documents is by filtering, wherein an interface is provided to allow the user to set parameters to arrive at a set of relevant documents. However, the large volume of available data causes an undesirable result in many of these general searches as most simple searches return large number of documents, many of which are not useful or not relevant to that which the user is seeking. On the other hand, if a user defines its request in an extremely detailed manner (e.g., including years, country, type of information, etc.), the system typically returns a low number of found documents, but some important documents may be omitted. To provide compromise between width of query and amount of received documents, these search engine systems allow the use of different auxiliary tools, e.g.:

Automatic "and queries": by default, universal search engine systems return only documents that satisfy all of mentioned search terms Exclusion of some words: The ability to return pages which do not include specific terms)

Automatic exclusion of common words: The ability to ignore "common" words and characters such as "where" and "how", as well as certain single digits and single letters Search within results: The ability to offer a search on previously found documents Negative terms: The ability to focus a search only by words related to a selected meaning of a word and to avoid other possible meanings if a search term has more than one meaning Positive terms: The ability to include an essential common word term if it is required for getting the results To define order of words To use function "one word is immediately after other word"

To use function "words on the common phrase"

Stemming (when appropriate, it will search not only for search terms, but also for words that are similar to some or all of those terms).

Lemmatization (words are increased from their canonical form, e.g., infinitive for verbs; thus, when appropriate, it will search not only for search terms, but also for words that are similar).

Phrase searches (if only want results that include an exact phrase are suitable).

Synonym search (if it is necessary to search not only for search term but also for it's synonyms)

"OR" search (to find pages that include either of two search terms)

Domain search (to search only within one specific website)

Occurrences (specify where search terms have to be occurring on the page—anywhere on the page, in the title, in links to the page, etc.)

Similar pages (to find pages that are related for a particular result)

Number of results (to see more results per page, that it is defined for default)

Language (to return pages written in any language or in some specific language)

File Format (to return pages on any format or on some specific format)

Date (to return pages updated in anytime or in some specific time interval)

Domain (to return pages from the specific site or domain)

Topic (to perform search in some specific topic)

Etc.

Nevertheless even these tools sometimes do not allow receiving some required documents. A common drawback of these universal search engine systems is that they do not allow getting a feedback from the user about the extent of success (or lack of success) of search which were performed earlier and to use this information for further "more thorough" search.

Some "corporative", domain-oriented specialized search engine systems (e.g., travel domain, education domain, real-estate domain, etc.) use feedback from users. Some web-based search engines use data mining capabilities. Such systems use unsupervised clustering to group documents by similar topics. According to a single query such systems are built to search "nearest" (from clustering point of view) documents and get them to the user. The unsupervised clustering procedure employs a group-average-linkage technique to determine relative distances between documents. Such systems take off-line into account behavior of similar users in the past, but they don't allow taking into account on-line, dynamic profile of the actual specific user.

A major limitation of these prior art approaches however, is their inability to apply learning procedures on-line and specifically for a given user/user's point of view, to improve search and selection outcome first of all for a given particular individual and his/her desired context, not for associated group of users on similar topic. The prior art approaches are also limited in their ability to apply only on corporative, specialized search engine systems.

SUMMARY OF THE INVENTION

A method and system for performing on-line user-sensitive individual and supervised learning, based on textual search engine. In this invention "textual" may be substituted by "text-based", "visual", "vocal", "image-based", "movie", etc. or any combination of them. The method is provided for accessing and searching text-based documents and may utilize a generic search allowing a user to simultaneously mark at least some of the found or reported documents as "suitable", or "non-suitable", or classifying their suitability by a ranking scale. A text mining mechanism may support supervised learning algorithms, whereas the system of the present invention is capable of storing previous search results and data as well as imported or predefined documents, or their combination, for use by these algorithms. The method may include steps of receiving a current user query by means of one or more sentences. These sentences may be used not for purpose of looking for exact match but just on purpose to enrich the space of 'suitable', 'partially suitable' or 'non-suitable' items. This may be done by requesting a search for data item such as text or visual or audio documents, descriptions, presentations, movies etc. after receiving from a user ranked estimations about "level of suitability" of at least some of such data items; learning of proposed algorithm under received sub-set of labeled documents; interactions with the user to reduce initial set of presented documents.

A multistage iterative procedure may implement a supervised learning algorithm and may be applied to decrease the amount of search results while increasing their quality for a current user. The outcome of this invention is an ability to replace the nonproductive users' work involved with the burden of providing exact description of their request, by the ability to improve the search results through the use of "approximate" descriptions, combination of "exact" and "non-exact" expressions, similar examples and general information which was earlier prepared or derived from the early received or retrieved results, different labels marked by user, user prepared sentences and inserts, as well as combination of all of the above, done by user.

The present invention includes a method of performing an on-line text categorization oriented on a personalized specific search and, as a result, obtaining iteratively converging search outcome. The method includes provisions of training for the supervised learning algorithm by search results and iterative, multistage procedure for prompt and step-by-step reducing set of obtained documents. Specific, original features of the invention are as following:

Multistage procedure of search

On-Line feedback from a single, specific user according with the user's labeling of presented reports by "suitable"/"non-suitable", or classifying them (the documents received on the current stage of the search or preliminary prepared documents) by a ranking scale, Iterative type of search, which assume sequenced stage-by-stage approximation of the required solution by means of the "non-exact" (or "not necessary exact") descriptions, "approximate" examples, printed or typed, and general information early prepared or derived from a previous stage, received or retrieved results, or combined from them, with reduction of amount of received documents and increasing relative part of documents, used for next stage of search Free Text Categorization approach to select documents, with high degree of suitability for single Specific user on current stage Supervised Learning Algorithm to perform text categorization All of the above is applicable to any document: printed, written, vocal, audio, image, movie, sound, etc., or any combination of them.

Further features and advantages of the present invention, as well as the structure and operation of various embodiments of the present invention are described in detail below with reference to the accompanying drawing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2A is a table depicting example of parameters, used by a user for formulation a query, according to embodiments of the present invention;

FIG. 3 is a table depicting an example of coding of documents according to embodiments of the present invention;

Figure 1:
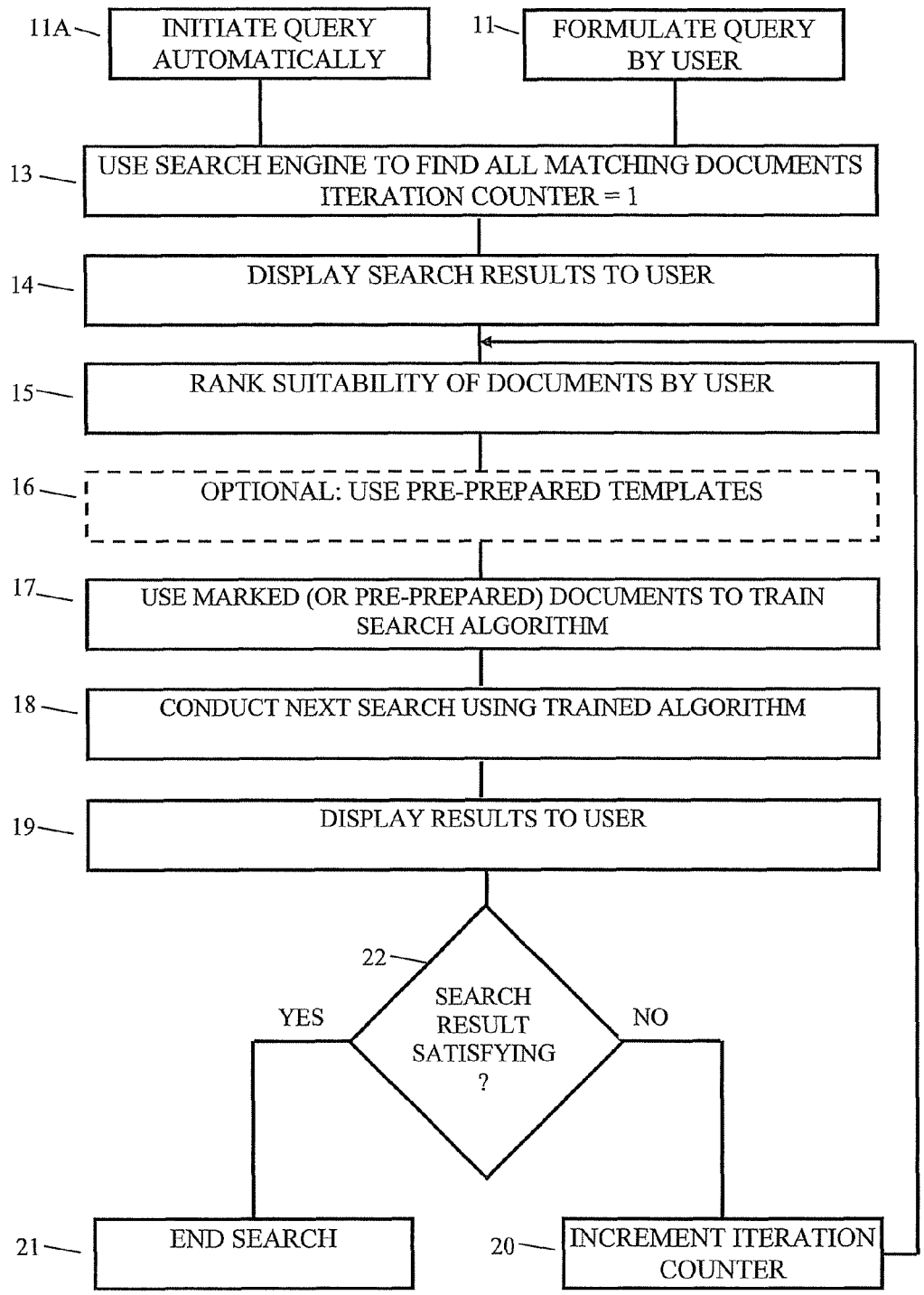
FIG. 1 is a schematic flow diagram of a process according to embodiments of the present invention.

It will be appreciated that for simplicity and clarity of illustration, elements shown in the figures have not necessarily been drawn to scale. For example, the dimensions- of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A preferred embodiment of the invention will now be described while referring to the figures, several of which may be simultaneously referred to during the course of the following description. Before the present systems and methods are described, it is to be understood that this invention is not limited to particular hardware or software described, as such may, of course, vary.

Figure 2B:
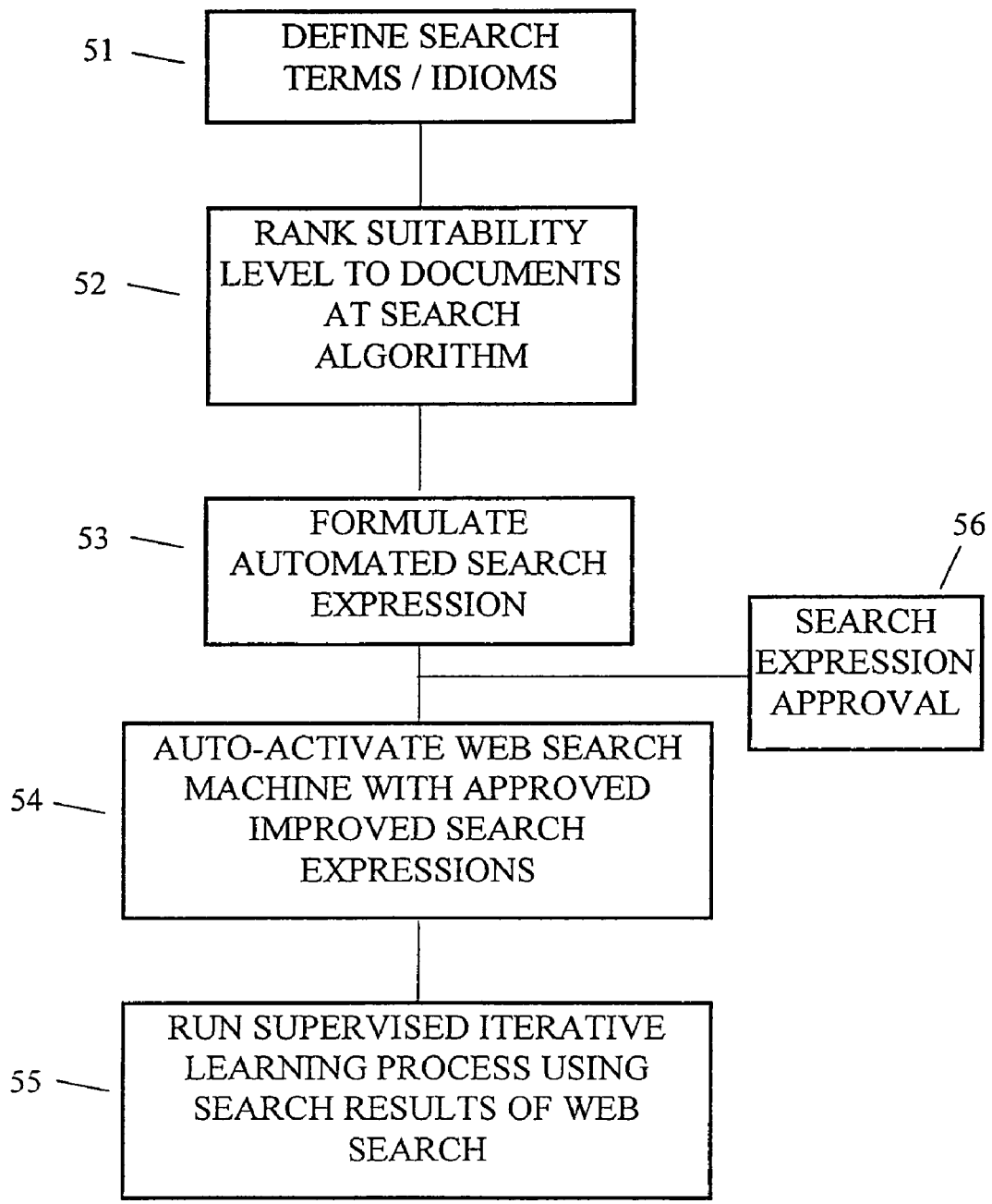
FIG. 2B is a schematic block diagram of a process for conducting a search according to embodiments of the present invention.

An On-Line Iterative Multistage Search Engine with Text Categorization and Supervised Learning according to a proposed implementation of the present invention will now be explained with reference to FIG. 1, which is schematic flow diagram of a process according to embodiments of the invention. A search engine may receive a query inputted by a user and perform standard, or regular, algorithm to search for ALL relevant documents. The result of this search may include a very large number of results, such as hundreds, thousands, million or even tens millions relevant text documents after a first search is performed (steps 11-13). Formulation of standard queries may be of one or more known alternatives. Attention is made now also to FIG. 2A, which is a table depicting example of parameters, used by a user for formulation a query, according to embodiments of the present invention. The left column in the table of FIG. 2A lists some examples of different alternatives for this query formulation. More examples may be found as searching tools in known search engines, such as Google, Yahoo, Altavista, Rambler and other search engines. Generally speaking, this query may not be restricted only to textual search. It may also define searches for image, dynamic image, movie, sound or combination of two or more of the above mentioned types of data.

User may view only part of ALL searched documents, typically the highest scored results, and may mark some (or all) of that part as "suitable" result, i.e. result that closely suits the goals of the search in the eyes of the user (Steps 14-15).

Several possible solutions to support such marking process may be proposed. According to a first possible solution Search Engine Algorithm may create a search result list of documents to user documents resulting from a 'straight forward' standard search. The user may mark a partial list from the results list comprising, for example, the first N documents (where N may equal to any predefined number, such as 100, 500, 1000, etc.). Alternatively, Search Engine Algorithm may provide the user with a preliminary list of selected documents (e.g., 100 documents from first 10000, 100 documents from second 10000, etc.), according to a predefined selection criteria. The documents in the list provided to the user may also be a randomly selected set of documents. Optimal solution may use a 'fairness' algorithm to choose that subset of documents (e.g., 1000) from a full initial set (e.g., 10,000,000). This 'fairness' algorithm may cause the subset of documents to include documents from different groups e.g. for the word 'entropy' it may be necessary to include documents both from category "physics" and category "philosophy", names of firms with the word "entropy" and names of theorems with word "entropy", etc.

User can match a 'rank of suitability' for a document by means of binary ranking (or estimation) e.g. Yes/No, or by means of multilevel ranking (e.g., "Fully suitable", "Very Similar", "Rather Similar than Not", "Rather Non-Similar than Similar", "Very Far", "Inappropriate", etc.). User can rank each single reviewed document, or can rank only useful documents, i.e. documents having high rank of suitability (e.g. "Suitable", "Very Similar", etc.) and all non-ranked documents may be considered as "non-suitable".

Simultaneously with or following after step 15, step 16 may be carried out. In step 16 a search engine according to embodiments of the present invention may use documents which were prepared manually or combined short documents. These documents may include sentences, abstracts, titles, etc. These prepared or combined documents may be used for performing text categorization. These documents have to be defined as "fully suitable" documents, but contrary to known approaches in which such documents are used for non-supervised clustering, e.g. used for clustering of documents which were found similar to such combined document, the combined documents according to embodiments of the present invention, may be used for Supervised Learning. These short documents may be prepared by the user by way of writing a short document, by using of pre-prepared documents or as a combination of both.

Once certain documents are identified and ranked (or marked) by a user as "suitable", with a corresponding degree or by-default as "non-suitable", these documents may simultaneously be used by a text mining algorithm for analysis and learning of the search results. The text mining algorithm is adapted to perform learning of related documents according to some supervised learning procedure and to display the results deployment, i.e. the related "suitable" documents. The text mining algorithm is adapted to compare words in a "training set" to words in a document to be characterized, in order to determine whether that document may be classified in a particular category ("Fully suitable", "Very Similar", "Rather Similar than Non-Similar", . . . ). Upon completion of categorization, a list of documents which were identified as matching a particular category may be stored for further use and may further be displayed to the user (Steps 17 and 18). The Text Categorization stages may, in some cases, consume a large amount of computing and storage resources. In order to allow performing of the categorization stages even in such circumstances, carrying out of these stages may be done remotely, on a host or other powerful remote computer.

The text mining algorithm is further capable of preparing a list of all of the "suitable" documents received from an initial (full) set of documents, after eliminating documents recognized as "non-suitable". If the set of "suitable" documents which is received after a first iteration is still too large (e.g., 1000 documents and more), a user can perform additional, repeated, cycles of the multistage search as depicted above with reference to stages 14-18, in order to refine the list of results as may fit his/her needs (stages 19, 22 and 20).

Second and later cycles of repeating of stages 14-18 may essentially differ from the first performance of stages 14-18, in several manners. On the first iteration the user can screen documents only according to 'title' and some limited (selected) attributes of the documents; on a second iteration the user may screen documents according to, for a non-limiting example, annotation of the document, on a third iteration the user may screen the documents according to annotation and introduction attributes, etc. Due to possible very limited amount of "fully suitable" documents a user on the first iteration can perform marking according multi-level evaluation, but on the second and third iteration can use binary marking procedure. This may be possible, because at the first iteration a supervised learning algorithm can get to user only "full and partially suitable" documents for its further more detailed analysis.

If the list of selected documents is very large (e.g., 10,000, 000 documents), the amount of "suitable " documents, as it may result from the screening by method of stages 14-18 (FIG. 1), even if performed twice or three times, may also be practically too large. This selection of a reduced list of documents from all "suitable" documents may be done due to direct order of documents on initial search set (e.g., due to rating of document, i.e due to amount of references for it) and due to probability of "true recognition of suitable", which is calculated simultaneously with recognition of each document as "suitable" or "non-suitable ".

According to the invention, a system and method of Supervised Learning for a customer text categorization is provided, which may perform suitable documents search and selection. In an on-line process, a Supervised Learning algorithm may be applied to increase the amount of the "suitable" search results for a given user. The Text Categorization process implements a supervised learning algorithm for receiving user interaction data from among a set of user interaction documents and train based on a history of user interactions and user feedback with the system as provided in user interaction documents. In this manner the supervised learning algorithm increase amount of the "suitable" documents. Feedback from previous user interactions provides data on documents to be suitable or non-suitable. The result of this invention is the ability to improve a set of suitable documents without the need for the customer to explicitly train the system.

Proposed Text Mining Algorithm May Include the Following Steps:

Step 1: Preprocessing. The first task in this step is to represent text and to select features. The vector space model may be used for representing of text documents. Each document may be represented as a vector of words. The entries in the vector are simple binary feature values, i.e. a word either occurs (i.e. present) or does not occur in a current document or according word frequency of occurrence in a document. To reduce number of features (i.e. to control the vocabulary size) several approaches may be used. One such approach is Stemming and lemmatization. Stemming is a well known technique of word reduction by which common suffix and prefix are stripped from the original word form. Lemmatization is a process by which words are reduced to their canonical form (e.g., verbs —to their infinitive). Additional approach may be using of an "Exclusion List". Exclusion list is a list that may include non-significant words such as "and", "be", "about", etc. Removing these words may drastically reduce the system vocabulary size and allows the system to focus only on important content words, thus improving its efficiency. Another approach may be eliminating words that appear in only certain number of documents. This number of documents may be one, two, three, or more documents —depending on the concrete implementation.

By default the Supervised Learning Algorithm of the present invention works as text mining, i.e. it uses only free text as input parameters, both for training and for recognition of non-displayed documents. Additionally and optionally the user can define some additional, structured parameters as input for this supervised learning algorithm. It is necessary to note, that rather than using of such parameters as Restrictions as in the regular search engine systems (e.g., language are ONLY English or French), supervised learning algorithm uses values of these structured parameters only for learning and further recognition. Example of coding (i.e. numerical representation of text) of an exemplary document (or part of an exemplary document —selected text, title, abstract, etc.) is illustrated in FIG. 3.

After building of vocabulary and coding of each document the next stage is data calibration and reduction of large values of some "extreme" features. For some situations this action isn't necessary (e.g., if ALL parameters are non-structured and binary coding is used). The following schemes may be used for this calibration:

Scaling for interval [0 . . . 1]
Scaling for interval [−1 . . . 1]
Scaling for interval with {mean=0, std=1 }
Scaling for gypersphere.

Step 2: Learning and Tuning of the Algorithm. This stage involves considering some limited amount of various models and choosing the best one of these text mining models based on their predictive performance that is explaining the variability in question and producing stable results across documents, marked by the user. The goal of automatic text-categorization system according to the present invention is to assign not-marked documents to one or more set of pre-defined categories on the basis of their textual content. Optimal categorization functions can be learned from labeled training examples (after real, customer "categorization", i.e. after marking of sub-set of documents). During text categorization algorithm used by some Training Set the following tasks may be solved:

Optimal selection of weights of single kernels (it is search of some control parameters by means of Quadratic Programming Task solving)

Optimal Choice of meta-parameters (type of kernels and penalty value) by means of cross-validation.

Generally speaking, the type and amount of different kernels isn't limited, but due to search time requirement and limited amount of marked documents, it is recommended to use only 2 . . . 4 different kernel types.

Implementation of these approaches essentially depends on classification type. In Binary Classification, the main purpose is to define whether the current documents describes category "suitability reports" or not. In Multi-Class Classification, the main goal is to select category not from two, but rather from several values.

Figure 4:
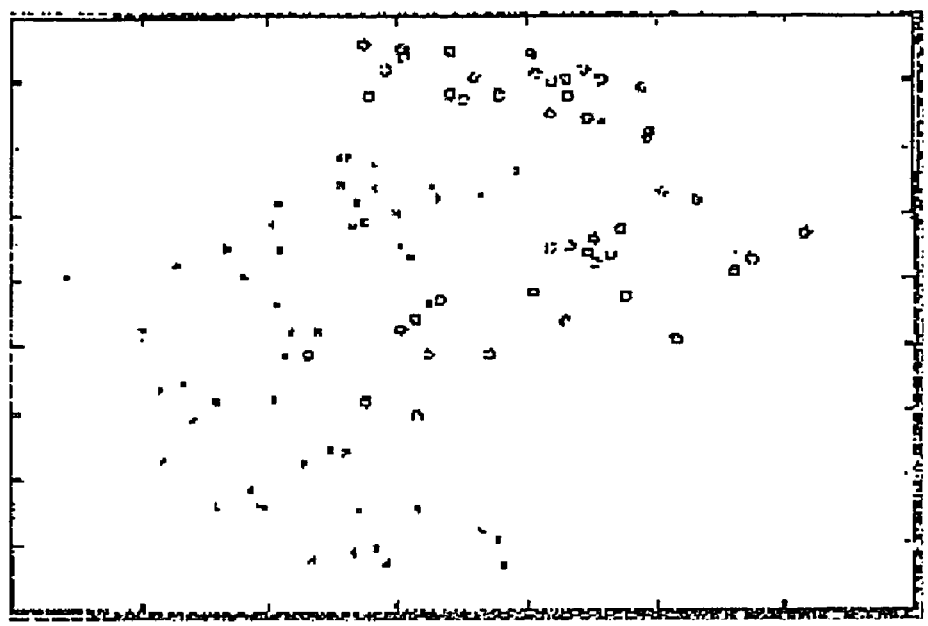
FIG. 4 which represents a two-dimensional training set interspersion example.

Generally speaking, the amount of categories isn't limited, but due to search time requirement it is recommended to use only binary classification. Attention is made now to FIG. 4 which represents a two-dimensional training set interspersion example. From visualization point of view FIG. 4 may represent two-dimensional training set of, for example, vocabulary of two words only. As seen in FIG. 4, the two parameters included in the field of results are either of one nature (represented as "x") or of a second nature (represented as "o"). In real field of results there may be 500 . . . 2000 input parameters (i.e. different words on vocabulary). For a training set a set of 100 documents is used, which the user may separates to category "suitable" (signed by "x" on the picture of FIG. 4) or to category "non-suitable" (signed "o" on the picture of FIG. 4).

Values of the classification algorithm control parameters (which may include type of separation line, degree of algebraic function, penalty) are selected by means of optimization tuning and values of kernels coefficients are selected by means of optimization under training set. Attention is made now to FIG. 5, which is an example of training set separation line 502, which separates the two-dimensional collection of results of FIG. 4 to two input parameters. Accordingly, once the separation line has been decided and/or calculated, all results on one side of such line shall be considered as being part of one parameter (such as word) and all results on the other side of the line are considered to be part of the other parameter (i.e. word).

Figure 5:
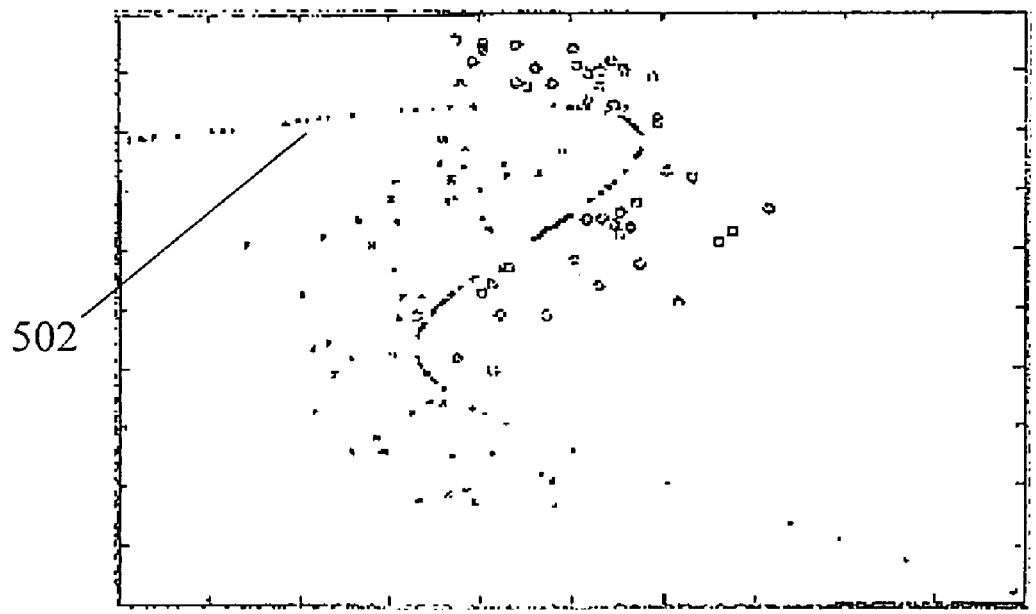
FIG. 5 is a schematic simplified example of training-set after a supervised learning stage has been applied according to embodiments of the present invention.
Figure 6:
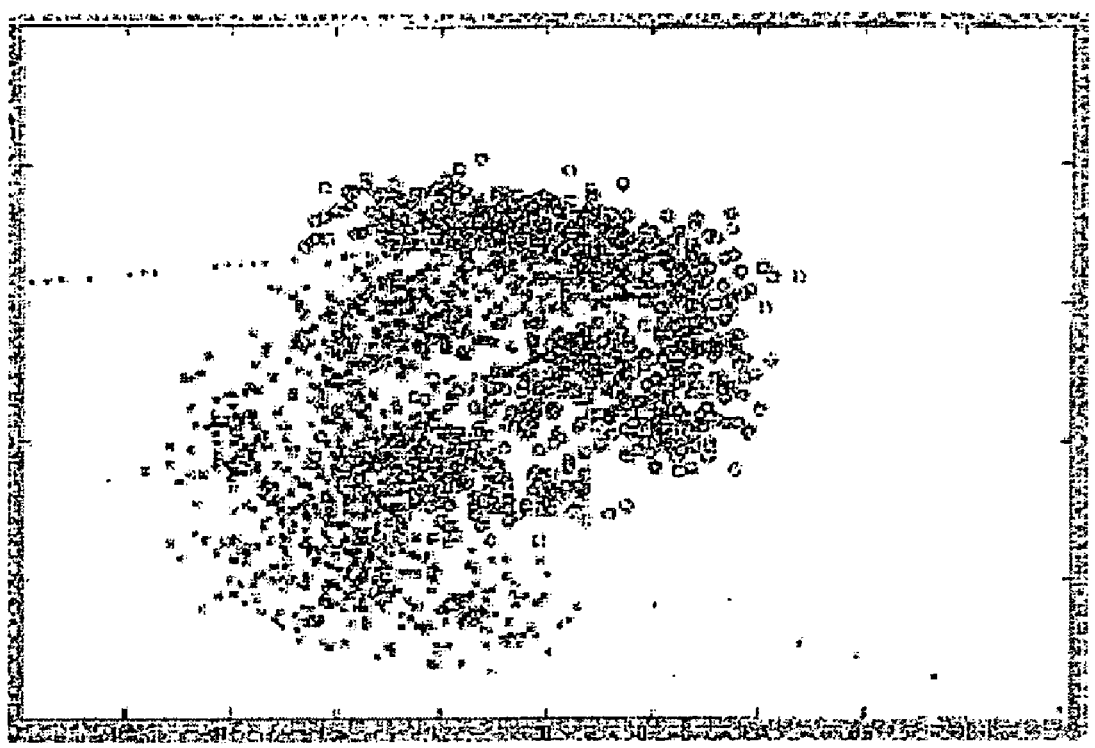
FIG. 6 is a schematic simplified example of using of algorithm for recognition of set of non-displayed documents according to embodiments of the present invention.

Step 3: Deployment. This final stage involves using the developed algorithm (with selected kernel type, meta-parameters and kernels weights) to not-marked documents data in order to generate its "suitable". Example of using of algorithm for two input parameters, as trained according to the examples of FIGS. 4 and 5, is shown in FIG. 6, for 2000 documents, both for category "suitable" (sign x on the pictures) or to category "non-suitable" (signed o on the pictures). A particular example of a text categorization technique that may be employed using the following SVM (Support Vector Machine) algorithm for determining a "suitable" of searched documents is described herein after. Consider data points, received after current stage of performing regular search of the form: $\{X[1], y[1]), (X[2], y[2]), \ldots, (X[n], y[n])\}$ where the y[i] is either 1 or −1—this label denotes the class to which the point X[i] belongs. Each of X[i] is a n dimensional vector of scaled [0,1] or [−1,1] values (the scaling is important to guard against variables with larger variance that might otherwise dominate the classification). If our algorithm use binary coding (it is preferable due simplicity and speed of training performing) the scaling isn't necessary. If we use for text categorization simultaneously marked results of search engine and some limited amount of "manually recorded phrases from customer", this set includes both two types of points (e.g., 100 marked of customer and 5 manually recorded of customer).

Label 1 means, that document belong for class "suitable" (or, may be, for unified class "Fully suitable+Very Similar+ Rather Similar that Non Similar", if we use multilevel classification), label −1 means, that document belongs for class "Non-suitable" (or, may be, for unified class "Fully Non suitable+Very Far+Rather Non-Similar that Similar", if we use multilevel classification). Index i=1 . . . n, where n is full amount (both marked and manually recorded) of documents on current stage, used for current text categorization. For using of binary coding the component j of n dimensional vector X[i] equals for 1, if j-th word from vocabulary is concluded on the document number i, otherwise this component equals for 0. For coding of document according word frequency the component j of n dimensional vector X[i] equals for frequency of this j-th word from vocabulary in the document i. Index j=1 . . . m, where m is full amount of words on the vocabulary on the current stage.

This set may be considered as training data, which denotes the correct classification which the SVM is eventually required to distinguish, by means of the dividing hyperplane, which takes the form $$y(X) = \sum_{i=1}^{n} a[i]y[i]K(X, X[i]) + w[0],$$

where K(X, X[i]) is kernel function and w[0] is bias. Some common kernels include, Linear: K(X, X')=(X*X')
Polynomial k(x, x')=(x·x'+1)$^d$
Gaussian Radial basis function:

$$k(x, x') = \exp\left(-\frac{\|x - x'\|^2}{2\sigma^2}\right)$$

Etc.

The training is really followed for Quadratic Programming Task solving: to find values a[1], . . . ,a[n] to minimize $$\sum_{i=1}^{n}\sum_{p=1}^{n} a[i]a[p]y[i]y[p]K(X[i], X[p]) - 2\sum_{i=1}^{n} a[i],$$

$$\text{s.t. } 0 <= a[i] <= C[i], \sum_{i=1}^{n} a[i]y[i] = 0.$$

Kernel parameters (type, degree of polynomial, etc.) and penalty parameters C[i] are meta-parameters and they are defined by means of performing tuning (using cross-validation). Usually C[i] is same for all points i=1 . . . n. Thus, different values should be used due to the following reasons. Training set, obtained from user on the current stage, is highly unbalanced. For example, it may consist on 990 documents, marked as "non-suitable" and only 10 documents, marked as "suitable". Training set also may simultaneously contain some (low) amount of "manually recorded" phrases, which importance, perhaps, is more high, than marked documents. According to this, penalty parameters C[i] may get following values:

S_suitable, if current point X[i] belongs to the "suitable"-marked Class
C_Nonsuit, if current point X[i] belongs to the "Non-suitable"-marked Class
C_Manual, if current point X[i] belongs to the "Suitable"-manually recorded Class To select optimal (or, rather, sub-optimal values of meta-parameters) the criteria may "FP+w*FN" be used, where FP is amount of documents, fault predicted as "suitable", FN is amount of document fault rejected as "non-suitable" and w is relative importance to reject true suitable for comparison with accept false suitable (e.g. w=10).

After obtaining the values of parameters a[i] the meta-parameters algorithm may use these parameters for recognizing the rest of the documents, i.e. not-marked documents. It is a very simple and fast procedure, so it can be quickly applied for very large amount of documents (e.g., hundred thousand or even million).

For each non-marked document X it is calculated the its value y(X)=

$$\sum_{i=1}^{n} a[i]y[i]K(X, X[i]) + w[0]. \text{ If } y(X) >= 0,$$

the non-marked document X is recognized as "Suitable", otherwise as "Non-Suitable". It is also possible to calculate confidence of this recognition (probability of true of recognition) and to get to user "Suitable" documents in order of reduction of this confidence.

"Post-processing" approaches may also be used, e.g. to perform some actions after selection of optimal weights a[i], i.e. after Quadratic Programming Task solving. For example, it may be used for changing (i.e. -optimization) of bias w[0] on the expression of y(X).

It is necessary to note, that the above detailed description is only a particular example of a text categorization technique that may be employed. It is possible to use some other implementations of SVM technique, for example following:

LS-SVM (Least Squares Support Vector Machine)
One-Class SVM
Etc.

It is possible to use also some other supervised learning techniques, for example the following:

Neural Networks
Decision Trees
Bayes Nets
And the like.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:
1. A method comprising:
(a) receiving, from a search engine, an initial list of search results in response to at least one search term;
(b) presenting a first selected portion of said initial list of search results to a user;
(c) receiving from a user indications about appropriateness of at least one result from said first selected portion;
(d) training and automatically updating parameters of a text mining algorithm according to said indications;

(e) selecting a next portion from said initial list of search results by performing said text mining algorithm with said updated parameters;
(f) presenting said next selected portion to said user; and
(g) receiving from a user indications about appropriateness of said next selected portion and repeating steps (d) to (g) until said user stops providing indications.

2. The method of claim 1 wherein said at least one search term is included in a search term group, and
wherein the size of said search term group is reduced by excluding repeating terms which include at least one of the following list: suffix, prefix.

3. The method of claim 1 wherein said step of updating text mining algorithm parameters comprise setting a separation line to distinguish between suitable and non-suitable documents.

4. The method of claim 1, wherein said step of receiving an initial list of search results is initiated automatically, based on a pre-prepared set of search terms.

5. The method of claim 1, wherein said ranking is a binary ranking.

6. The method of claim 1, wherein said ranking is a multi-level ranking.

7. The method of claim 1, wherein said text mining algorithm parameters are free text parameters.

8. The method of claim 1, wherein said text mining algorithm parameters are textual and structured parameters.

* * * * *